(12) United States Patent
Yamazaki

(10) Patent No.: US 7,668,447 B2
(45) Date of Patent: Feb. 23, 2010

(54) IMAGE STABILIZATION APPARATUS AND OPTICAL APPARATUS

(75) Inventor: Tatsuya Yamazaki, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 375 days.

(21) Appl. No.: 11/622,549

(22) Filed: Jan. 12, 2007

(65) Prior Publication Data

US 2007/0166021 A1 Jul. 19, 2007

(30) Foreign Application Priority Data

Jan. 13, 2006 (JP) ............... 2006-005545

(51) Int. Cl.
*G03B 17/00* (2006.01)
(52) U.S. Cl. ............... 396/55; 348/208.3
(58) Field of Classification Search ............. 396/52–55; 348/208.99, 208.2, 208.3, 208.4
See application file for complete search history.

(56) References Cited

U.S. PATENT DOCUMENTS

| | | | |
|---|---|---|---|
| 5,761,545 A | * | 6/1998 | Tanaka et al. ............. 396/53 |
| 6,414,715 B1 | * | 7/2002 | Sato ................ 348/207.99 |
| 6,734,901 B1 | * | 5/2004 | Kawahara et al. ......... 348/208.4 |
| 2002/0047906 A1 | * | 4/2002 | Ohta ............... 348/208 |
| 2005/0254805 A1 | * | 11/2005 | Moriya et al. ........... 396/53 |

FOREIGN PATENT DOCUMENTS

| | | |
|---|---|---|
| JP | 05-142615 | 6/1993 |
| JP | 10-282536 | 10/1998 |
| JP | 2003-219265 | 7/2003 |

\* cited by examiner

*Primary Examiner*—Melissa J Koval
*Assistant Examiner*—Autumn Parker

(57) ABSTRACT

An image stabilization apparatus is disclosed which maintains image stabilization performance in ordinary use, enables improvement in the behavior of the image in panning, and allow image shake correction operation to be started immediately after the completion of the panning. The apparatus includes a shake sensor, a shake correcting part, a correction value calculator which calculates a first correction value based on an output from the shake sensor, an extractor which extracts a DC component from the output of the shake sensor, and a subtraction amount calculator which calculates a subtraction amount in accordance with the DC component and the first correction value. The apparatus further includes a subtracter which subtracts the subtraction amount from the first correction value to calculate a second correction value, and a controller which controls drive of the shake correcting part based on the second correction value.

16 Claims, 9 Drawing Sheets

IMAGE STABILIZATION APPARATUS AND OPTICAL APPARATUS

BACKGROUND OF THE INVENTION

The present invention relates to an image stabilization apparatus which is installed in an optical apparatus such as a video camera, a digital still camera, and an interchangeable lens.

Image stabilization apparatuses for detecting shakes of an optical apparatus with a shake sensor such as a gyro-sensor to reduce image shake are broadly classified into an electronic type and an optical type as disclosed in Japanese Patent Laid-Open No. 2003-219265, for example.

An important criterion to evaluate the performance of the image stabilization apparatuses is smooth behavior of the image (picked-up image) in panning. For panning control, a method of changing the cut-off frequency of a filter is used as disclosed, for example, in Japanese Patent Laid-Open No. 2003-219265.

The electronic image stabilization and the processing of panning will hereinafter be described in brief.

FIG. 10 shows the structure of an image-pickup apparatus such as a video camera in which an angular velocity sensor detects shakes and image shake correction (image stabilization) is performed by clipping a necessary pixel area from the full pixel image provided by an image-pickup element.

In FIG. 10, reference numeral 1001 shows a lens unit, and 1002 a solid-state image-pickup element such as a CCD sensor and a CMOS sensor (hereinafter referred to as a CCD). In the electronic image stabilization, the CCD 1002 has more pixels than those of a standard CCD required in a broadcast system (for example, NTSC system and PAL system). Reference numeral 1003 shows a CCD drive circuit which drives the CCD 1002 and can select which lines of the CCD are clipped as a pixel area to be output finally in a vertical synchronization direction in response to a control instruction from a microcomputer 1009, later described.

Reference numeral 1004 shows an analog signal processor which performs predetermined processing on a signal provided by the CCD 1002 to produce an analog image-pickup signal. Reference numeral 1005 shows a camera signal processor which contains an A/D converter and produces a video signal to be output finally. Reference numeral 1006 shows a line memory which can store at least one line of digital image-pickup signal through a memory control circuit 1007. The stored digital image-pickup signal can be read out from a predetermined position (address) in the line memory 1006 through the memory control circuit 1007.

The digital image-pickup signal stored in the line memory 1006 includes more pixels than those in a standard image size. The memory control circuit 1007 can select the first one of pixels to be read from the line memory 1006 in response to a control instruction from the microcomputer 1009, later described, and read the pixels corresponding to the standard image size.

Reference numeral 101 shows an angular velocity sensor which detects shakes of the image-pickup apparatus. Two angular velocity sensors 101 are generally used to detect shakes in two directions, that is, a vertical direction and a horizontal direction. Since the two sensors have exactly the same functions, only one of the directions is described herein.

Reference numeral 102 shows a high-pass filter (hereinafter referred to as an HPF) which cuts a direct-current component (hereinafter referred to as a DC component) in the output from the angular velocity sensor 101. Reference numeral 103 shows an amplifier which amplifies a detected angular velocity signal.

Reference numeral 104 shows an A/D converter which is contained in the microcomputer 1009. The angular velocity signals for the two directions are converted by this built-in A/D converter 104 into digital signals which serve as angular velocity data. The angular velocity data is subjected to predetermined signal processing by an HPF 105 and a phase compensation filter 106, passes through a variable HPF 701 which has a variable cut-off frequency, and then is input to an integrator 107. The integrator 107 generates shake correction signals for the vertical and horizontal directions based on the angular velocity data.

Reference numeral 1008 shows a correction-system controller which transmits the produced shake correction signals such that the shake correction signal for the vertical direction is transmitted to the CCD drive circuit 1003 and the shake correction signal for the horizontal direction is transmitted to the memory control circuit 1007. As described above, each of the CCD drive circuit 1003 and the memory control circuit 1007 changes the position at which the pixel area is clipped in response to the shake correction signals. When panning is detected, panning control is performed by processing such as changing the cut-off frequency of the variable HPF 701. The panning control will be described later.

Reference numeral 1009 shows the microcomputer which performs control of the CCD drive circuit 1003, the image shake correction control, and the like. The microcomputer 1009 controls the CCD drive circuit 1003 and the memory control circuit 1007 based on the shake correction signals calculated by the integrator 107 to achieve the image shake correction operation.

With the series of operations, the standard image size is extracted from the size of the full pixel image larger than the standard size, and the position at which it is extracted is controlled in response to the shake correction signals, thereby allowing correction of image shake due to camera shake or the like.

The panning control will now be described. When a user performs panning or tilting, the image is desirably changed as the user intends. However, if panning is performed during ordinary image shake correction, the image is not changed due to the image shake correction at the time of the start of panning, and the image starts to be changed abruptly when the amount of panning goes out of a range in which the image shake correction is possible. This causes the user to see a discontinuous change in the image. At the time of the end of panning, the image is fixed at the correction end (that is, a clipped pixel area or a movable member is located at the end of its movable range) and the image shake correction cannot be performed. The panning control is performed in order to avoid the situation.

As an example of the panning control, the correction-system controller 1008 detects whether or not the output from the abovementioned integrator 107 exceeds a predetermined correction amount, and if it is exceeded, the cut-off frequency of the variable HPF 701 having the variable cut-off frequency as described above is changed to remove a low-frequency signal to limit the correction amount. The panning control can restrain the image shake correction for the movement of the apparatus resulting from panning while the panning is performed, thereby achieving image shake correction operation as the user intends.

The method of changing the HPF cut-off frequency has been described as the panning control, similar control can be performed by changing the constant of integration in the integrator 107.

Besides, as disclosed in Japanese Patent Laid-Open No. H05(1993)-142615 and Japanese Patent Laid-Open No. H10 (1998)-282536, a DC component may be extracted and subtracted from the output of an angular velocity sensor, or an amount equivalent to a DC component produced due to panning may be predicted and subtracted from the output of an integrator.

The panning control in the abovementioned related art, however, presents the following problems.

When the gyro-sensor is used as the shake sensor, the output from the gyro-sensor needs to be amplified by 50 to 100 times. The amplification with the high gain requires cutting of a DC component to provide a proper signal because of saturation of the output from the amplifier. For this reason, the amplification is typically performed after the DC component is cut by an HPF with a cut-off frequency of 0.05 Hz or lower.

FIG. 9 schematically shows the output from the gyro-sensor and the output from the amplifier when panning is performed with constant velocity. In reality, shakes caused by camera shake overlap with the waveforms shown in FIG. 9, but those shakes are omitted in FIG. 9.

As shown in FIG. 9, the output from the amplifier approaches the central value with time due to the effect of the time constant of the HPF described above. When the panning is ended, the voltage changed by the time constant of the HPF is generated in the reverse direction relative to the central value.

In the method of increasing the cut-off frequency of the HPF to perform the panning control described in the abovementioned related art, the cut-off frequency is returned to the ordinary value after the completion of the panning is detected. If the cut-off frequency is returned to the ordinary value simultaneously with the completion of the panning in the method, the abovementioned reverse output (voltage) causes the image shake correction to be performed in the opposite direction. This causes a swing-back phenomenon of the image, which makes the image visually undesirable.

To avoid this, the cut-off frequency needs to be held high while the reverse output is produced. The cut-off frequency during the panning is approximately 20 Hz. If the cut-off frequency is held high until the output from the HPF is stabilized after the panning is completed, a long time is taken before the image shake correction function takes effect despite the completion of the panning.

In the method of subtracting the DC component produced during the panning, there is no way to confirm whether or not the data to be subtracted is actually equivalent to the DC component produced by the panning. Thus, the swing-back may occur in the movement of the image at the completion of the panning or the image may make a different movement from an intended camera operation, leading to an unnatural image.

There is another simpler method to increase the cut-off frequency of the HPF 105 in FIG. 10. The cut-off frequency of the HPF 105 is typically set to approximately 0.1 to 0.3 Hz. The cut-off frequency can be increased to approximately 1.2 to 2.0 Hz to avoid an increase in the DC component produced during panning. As a result, the behavior of the image after the panning is improved.

In the method, however, the image stabilization performance itself is deteriorated, so that the stability of the image is reduced when an image of a still object is picked up.

BRIEF SUMMARY OF THE INVENTION

The present invention provides an image stabilization apparatus and an optical apparatus which maintain image stabilization performance in ordinary use, enable improvement in the behavior of the image when panning is performed (especially after panning), and allow image shake correction operation to be started immediately after the completion of the panning.

The present invention in its one aspect provides an image stabilization apparatus which comprises a shake sensor which detects a shake, a shake correcting part which performs operation for suppressing image shake, a correction value calculator which calculates a first correction value based on an output from the shake sensor, an extractor which extracts a DC component from the output of the shake sensor, and a subtraction amount calculator which calculates a subtraction amount in accordance with the DC component and the first correction value. The apparatus further comprises a subtracter which subtracts the subtraction amount from the first correction value to calculate a second correction value, and a controller which controls drive of the shake correcting part based on the second correction value.

The present invention in its another aspect provides an optical apparatus which includes the abovementioned image stabilization apparatus.

Other objects and features of the present invention will be apparent from the following description of preferred embodiments with reference to the accompanying drawings.

DETAILED DESCRIPTION OF THE PREFERRED EMBODIMENTS

Preferred embodiments of the present invention will hereinafter be described with reference to the drawings.

Embodiment 1

Figure 1:
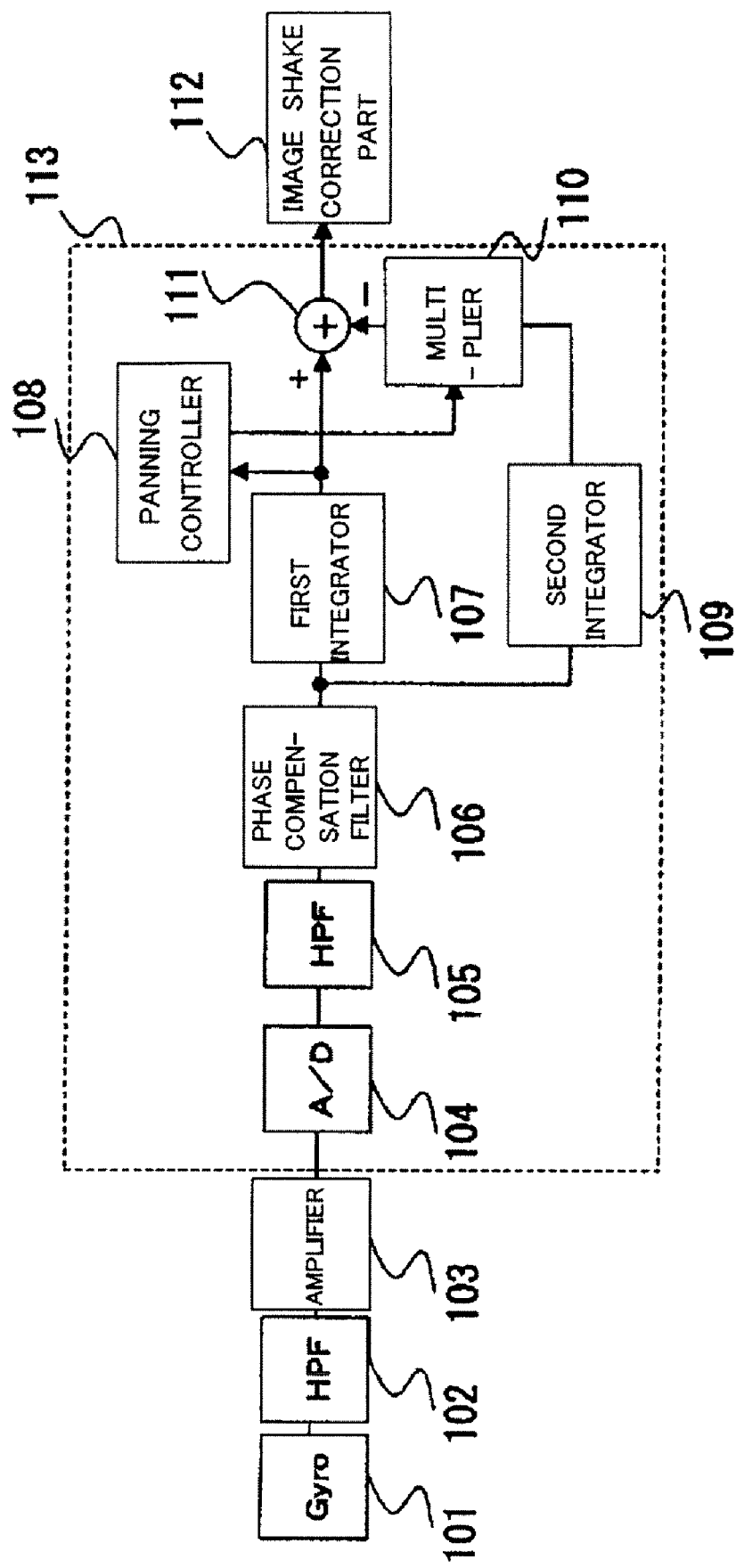
FIG. 1 is a block diagram showing the structure of an optical apparatus which is Embodiment 1 of the present invention.
Figure 10:
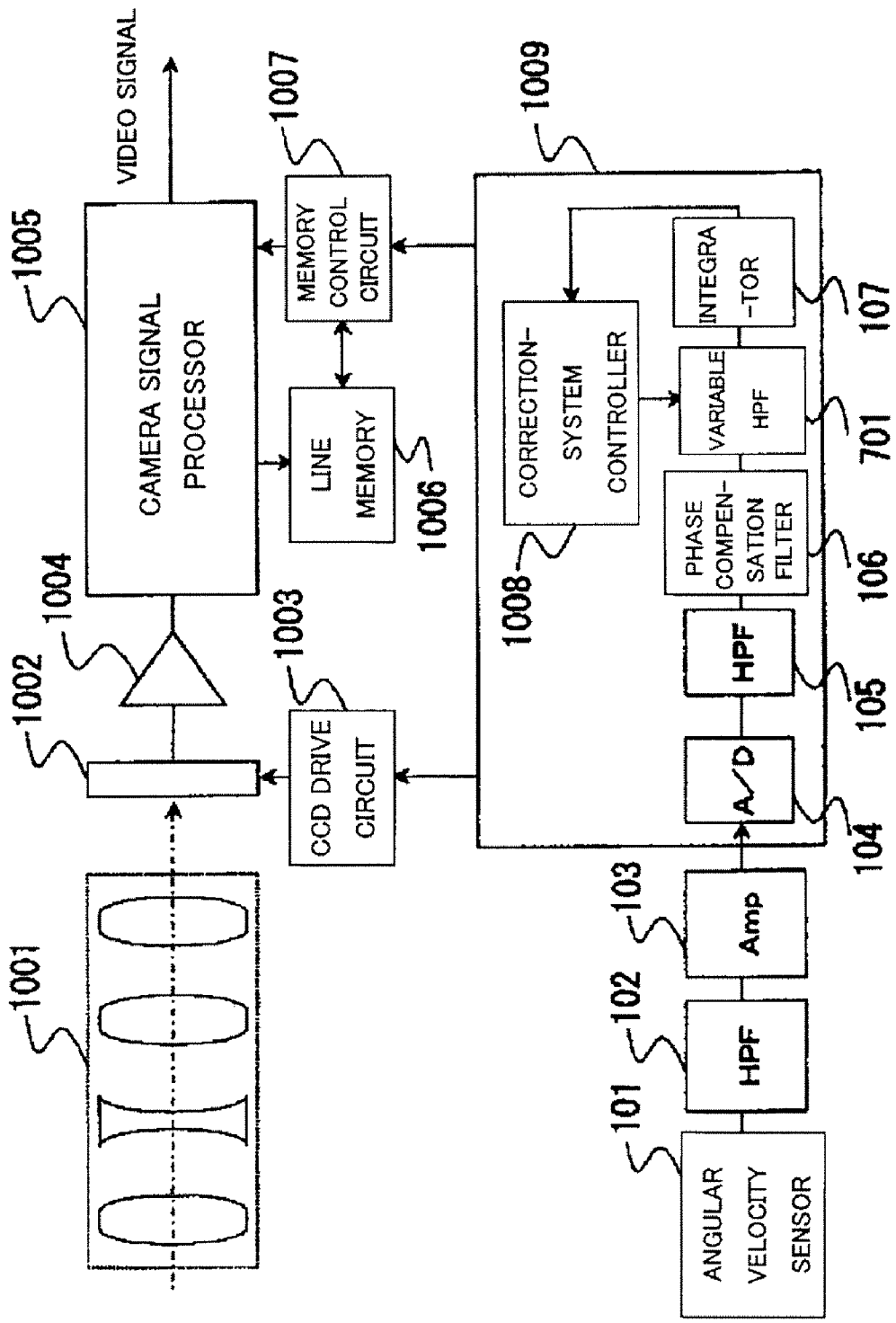
FIG. 10 is a block diagram showing the structure of an optical apparatus in the related art.

FIG. 1 is a block diagram showing the structure of an image-pickup apparatus (optical apparatus) which is Embodiment 1 of the present invention such as a video camera. In FIG. 1, components having the same functions as those in FIG. 10 are designated with the same reference numerals, and description thereof will be omitted.

Reference numeral 108 shows a panning controller which detects the panning state from a first correction value which is the output from a first integrator 107 serving as a correction value calculator, and then performs the setting of the panning control, that is, the setting of a subtraction coefficient G, later described.

Reference numeral 109 shows a second integrator which has a frequency characteristic different from that of the first integrator 107.

Reference numeral 110 shows a multiplier which multiplies the output from the second integrator 109 by the predetermined subtraction coefficient G. The panning controller 108 and the multiplier 110 correspond to a subtraction amount calculator.

Reference numeral 111 shows an adder (subtracter) which calculates the difference between the output from the integrator 107 and the output from the multiplier 110.

Reference numeral 112 shows an image shake correcting part which performs operation for correcting (suppressing) image shake, and 113 a microcomputer serving as a controller which performs control of the entire image shake correction. The image shake correcting part 112 corresponds to the CCD drive circuit 1003 and the memory control circuit 1007 as shown in FIG. 10 in the case of the electronic image stabilization.

In the case of the optical image stabilization, the image shake correcting part 112 corresponds to movable members such as a correction lens which moves in a direction orthogonal to an optical axis or directions including that direction, a variable angle prism, and an image-pickup element which can move in the direction orthogonal to the optical axis, and drive circuits thereof.

Figure 2:
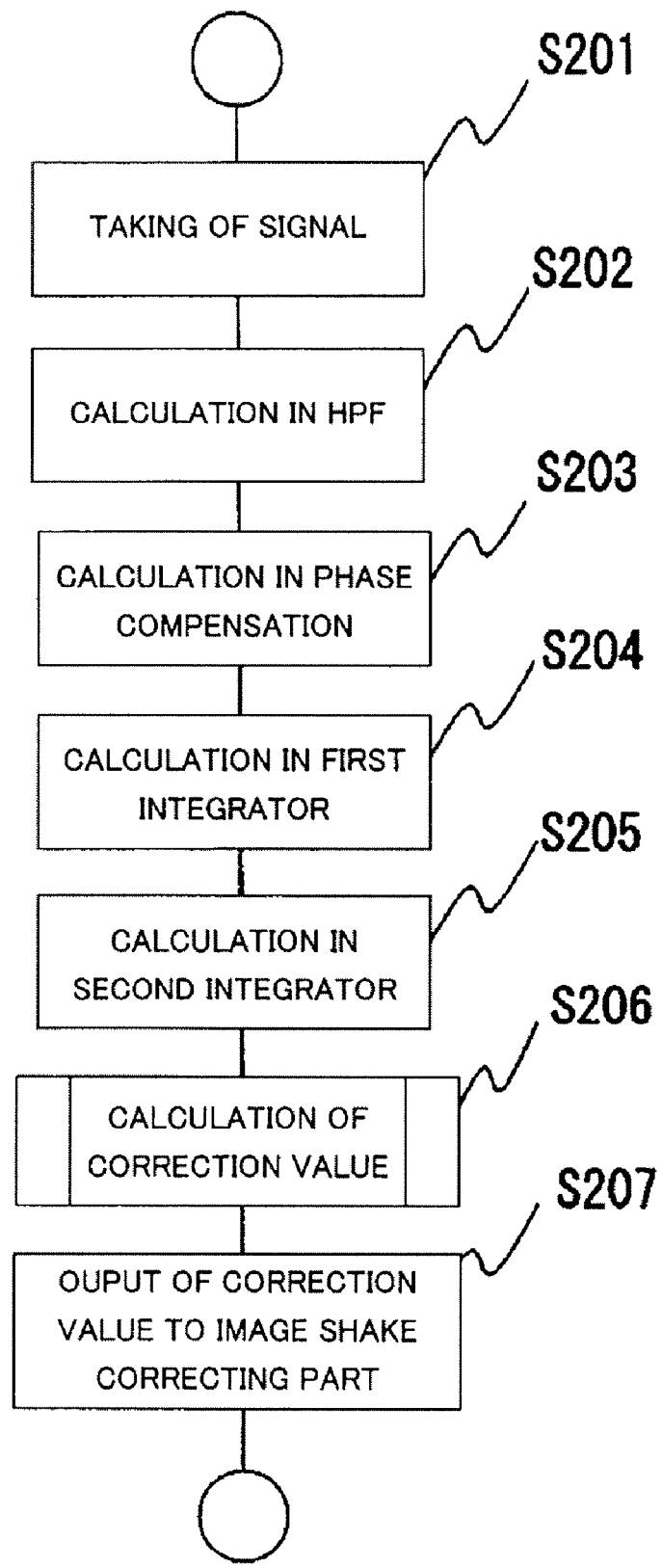
FIG. 2 is a flow chart showing the operation of a microcomputer in Embodiment 1.

FIG. 2 is a flow chart which shows the operation of the microcomputer 113 in Embodiment 1.

In FIG. 2, at step S201, an A/D converter 104 takes angular velocity data. The calculation in an HPF 105 is performed at step S202, and then the calculation in a phase compensation filter 106 is performed at step S203. At step S204, the calculation in the first integrator 107 is performed to provide the first correction value.

Next, at step S205, the calculation in the second integrator 109, that is, extraction of a DC component is performed. At step S206, the calculation of a correction value (second correction value) for use in actually driving the image shake correcting part 112 is performed. The correction value calculated at step S206 is output to the image shake correcting part 112 at step S207.

Figure 3:
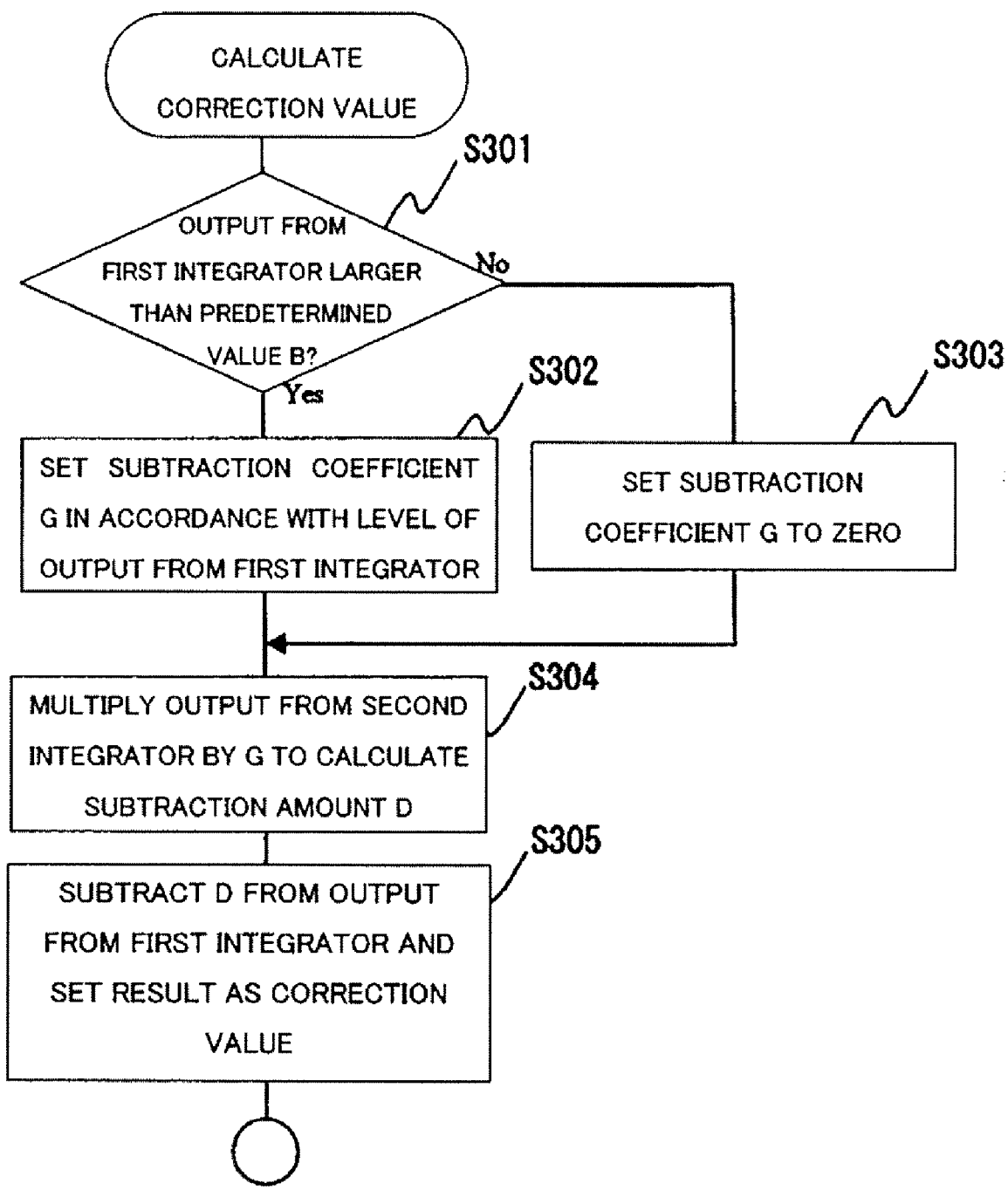
FIG. 3 is a flow chart showing the processing of calculating a correction value in the flow chart of FIG. 2.

FIG. 3 is a flow chart showing the calculation of the second correction value at step S206. The processing in FIG. 3 is performed by the panning controller 108, the multiplier 110, and the adder 111 in FIG. 1.

In FIG. 3, at step S301, it is determined whether or not the output from the first integrator 107 exceeds a predetermined value B. The predetermined value B is a reference value for detecting panning and is set to a value close to the correction end of a range in which the image shake correction is possible. If the predetermined value B is exceeded, the subtraction coefficient G is set in accordance with the output result (the first correction value) from the first integrator at step S302. The value of the subtraction coefficient G is set in a range from $0 < G \leq 1$ (100%).

Figure 4:
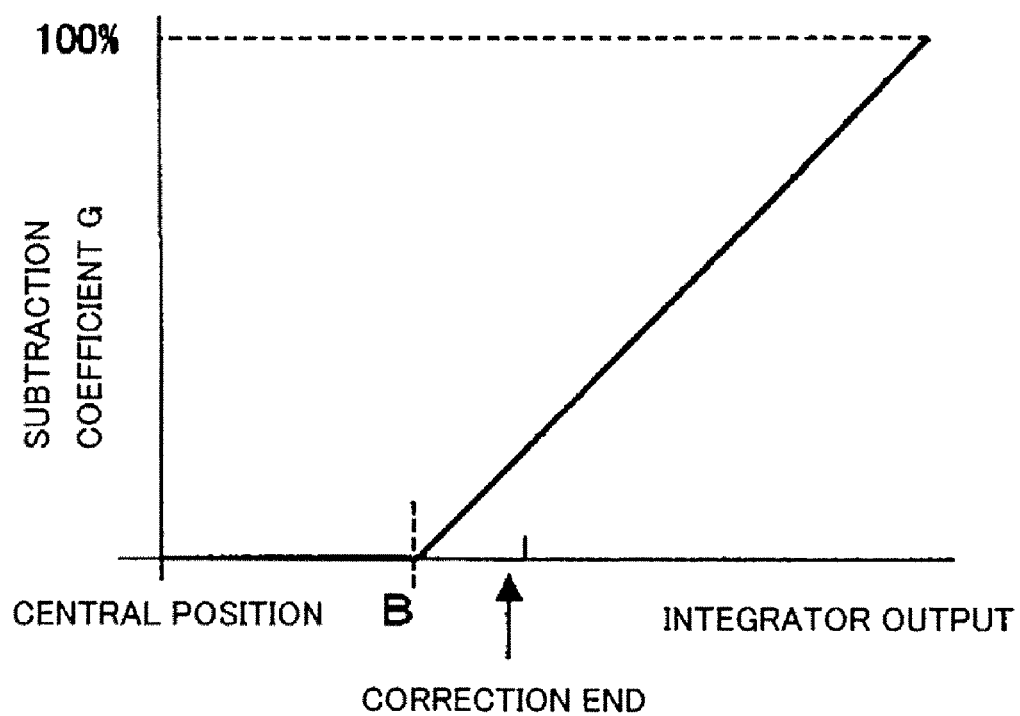
FIG. 4 shows a subtraction coefficient in Embodiment 1.

FIG. 4 shows the values of the subtraction coefficient G. If the output from the first integrator 107 exceeds the predetermined value B, the value of the subtraction coefficient G is increased in accordance with the output from the first integrator 107 and finally reaches 1 (100%).

If the output from the first integrator 107 is equal to or lower than the predetermined value B at step S301, the subtraction coefficient G is set to zero at step S303. At step S304, the output from the second integrator 109 is multiplied by the subtraction coefficient G to calculate a subtraction amount D. In other words, the subtraction amount D is set in accordance with the level of the output from the first integrator 107. If the output from the first integrator 107 is equal to or lower than the predetermined value B, the subtraction amount is zero. If the output from the first integrator 107 is greater than the predetermined value B, the subtraction amount D is calculated in accordance with the level of the output from the first integrator 107.

Then, at step S305, the subtraction amount D is subtracted from the output (first correction value) from the first integrator 107 to calculate the second correction value. As a result, the second correction value is equal to the output value from the first integrator 107 if the output from the first integrator 107 is equal to or lower than the predetermined value B. If the output from the first integrator 107 is greater than the predetermined value B, the second correction value is changed in accordance with the level of the output from the first integrator 107.

Next, description will be made of the image shake correction operation when the processing shown in FIG. 3 is performed. Ordinary image shake correction processing is performed until the output (first correction value) from the first integrator 107 reaches the predetermined value B shown in FIG. 4.

If panning is performed to cause the output from the first integrator 107 to exceed the predetermined value B and approach the correction end, several percents of the output from the second integrator 109 are subtracted from the first correction value in accordance with the subtraction coefficient G, and the result is set as the second correction value for use in actual image shake correction. The second correction value is provided by cutting a DC component to some extent from the output of the first integrator 107. As the output from the first integrator 107 becomes greater, the subtraction amount D is increased in accordance with the subtraction coefficient G in FIG. 4, so that the second correction value provided after the subtraction is close to the correction end.

Figure 5:
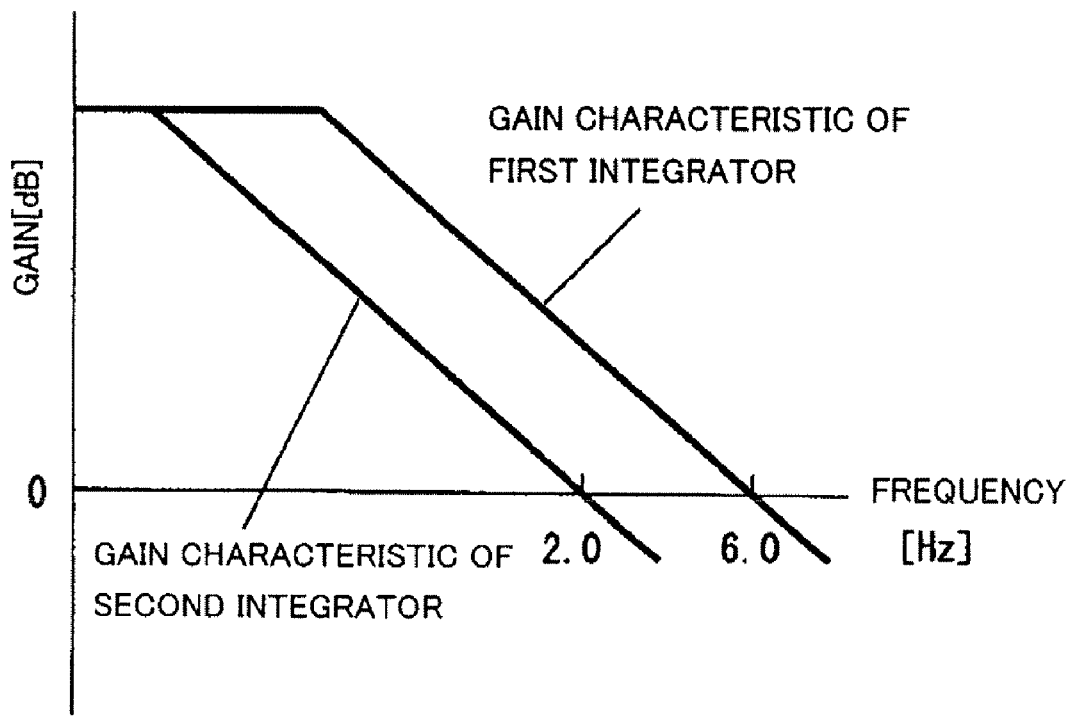
FIG. 5 shows the characteristics of a first integrator and a second integrator in Embodiment 1.

FIG. 5 shows the characteristics of the first integrator 107 and the second integrator 109. As seen from FIG. 5, the integrators are not ideal ones but are low-pass filters with gains. Since the ideal integrator has an infinite gain for a DC component, the practically used integrators desirably have such characteristics.

The second integrator 109 has a cut-off frequency set to a lower level than that of the first integrator 107. Thus, when the output from the first integrator 107 is larger than the predetermined value B, the output from the second integrator 109 corresponds to the DC component extracted during panning. The gains of the first integrator 107 and the second integrator 109 are set to the equal levels.

As the subtraction coefficient G becomes higher to increase the subtraction amount D, signals in a band necessary for image shake correction are reduced together with the DC component. However, even when the subtraction coefficient G becomes equal to 100% to set the subtraction amount D to the maximum value, signals from 4 Hz to 12 Hz which fall within a band necessary for image shake correction are left without being removed. Therefore, although image stabilization performance is slightly reduced, the effect thereof is clearly recognized. In other words, the method can prevent fixing at the correction end due to panning while reducing deterioration of image stabilization performance.

Figure 6:
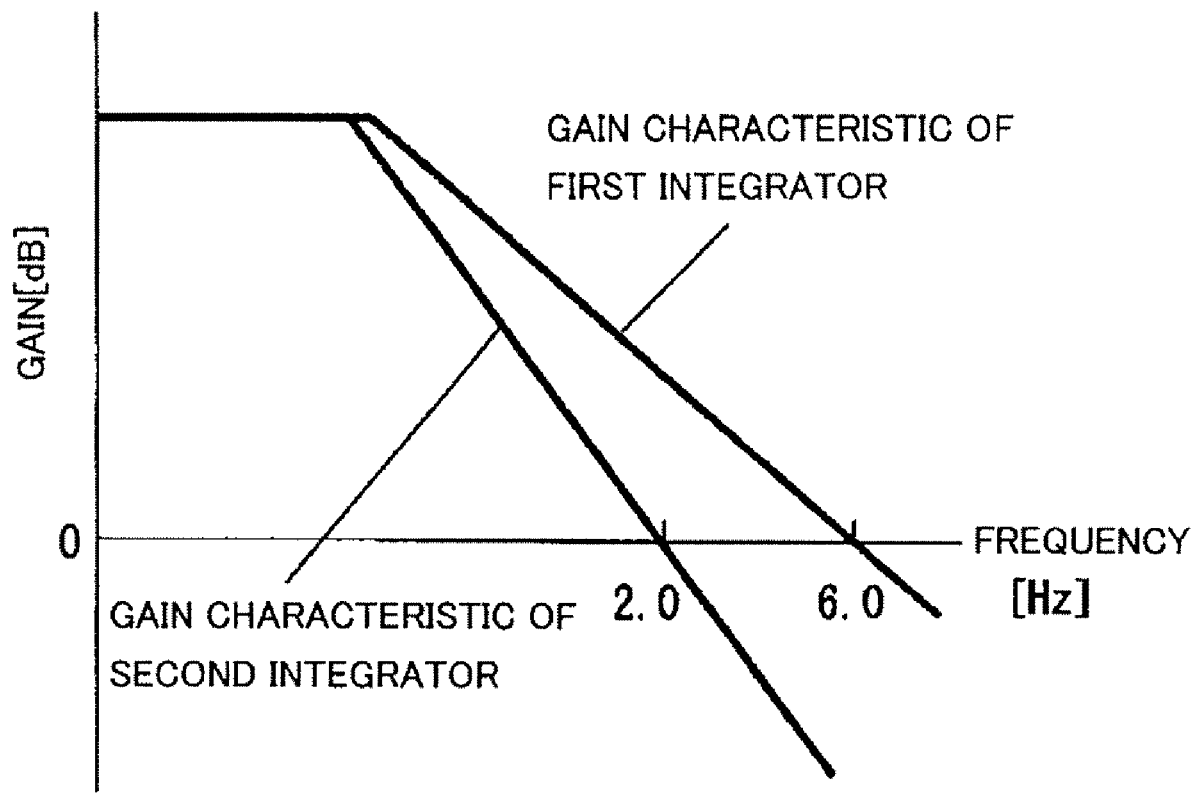
FIG. 6 shows another characteristic of the second integrator in Embodiment 1.

FIG. 6 shows another characteristic of the second integrator 109. While the second integrator 109 shown in FIG. 5 has the characteristic as a first-order filter, the second integrator 109 in FIG. 6 has the characteristic as a second-order filter. When the characteristic of the second integrator 109 is set in this manner, signals in a band necessary for image shake correction are left even when the subtraction amount D is subtracted from the first correction value. Thus, the fixing at the correction end due to panning can be prevented, and deterioration of the image stabilization performance can be further reduced as compared with the case where the second integrator has the characteristic shown in FIG. 5.

As described above, in Embodiment 1, the second integrator 109 is provided in addition to the first integrator 107 which calculates the first correction value, and the subtraction amount D calculated from the output of the second integrator 109 in accordance with the output of the first integrator 107 is subtracted from the output of the first integrator 107. The result is input to the image shake correcting part 112 as the second correction value. Therefore, the behavior of the image after the panning can be improved while the stability of the image stabilization performance is maintained in ordinary image-pickup operation.

Embodiment 2

Next, Embodiment 2 of the present invention will be described. Embodiment 2 specifically shows a method of improving a low-frequency characteristic in image shake correction operation.

Figure 7:
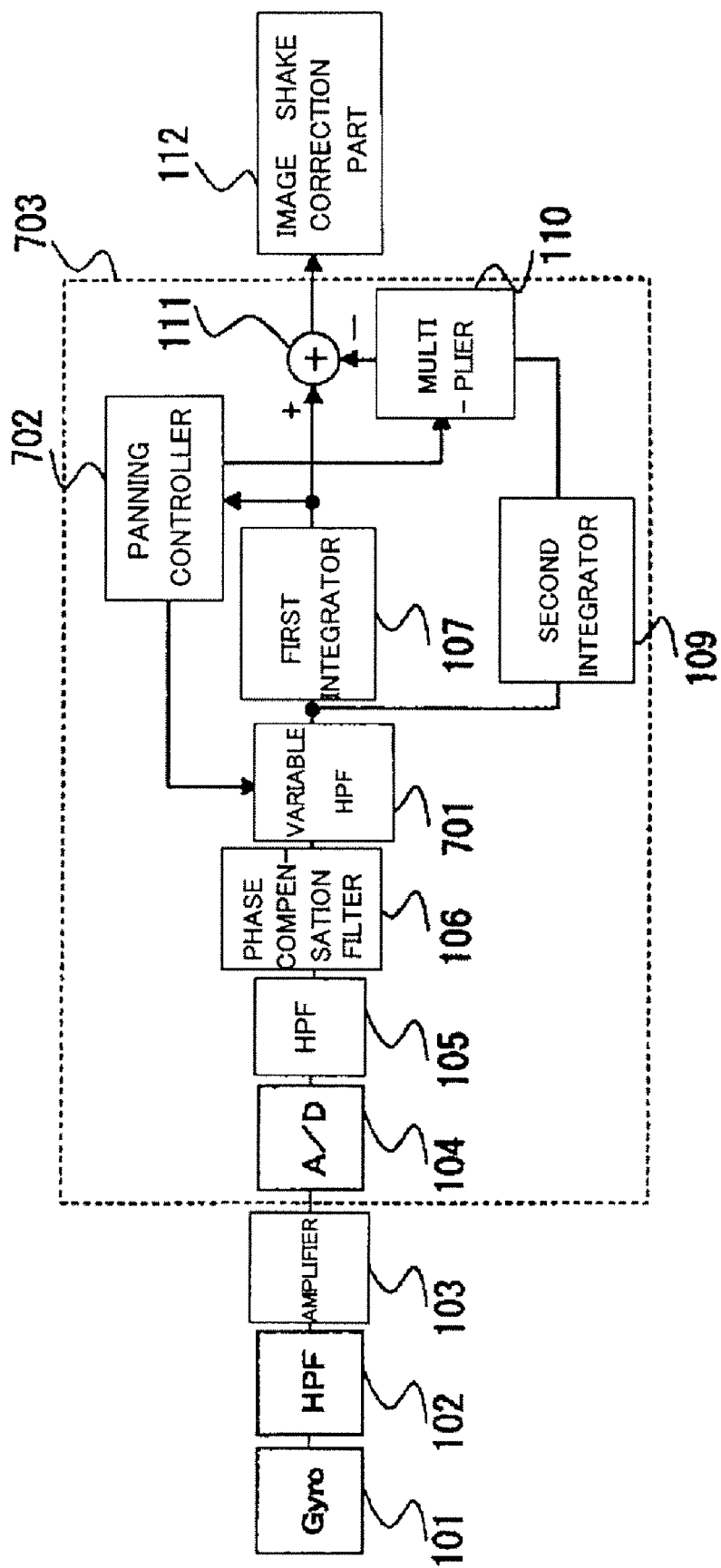
FIG. 7 is a block diagram showing the structure of an optical apparatus which is Embodiment 2 of the present invention.

FIG. 7 is a block diagram showing the structure of an image-pickup apparatus (optical apparatus) which is Embodiment 2 of the present invention. In FIG. 7, components having the same functions as those in FIGS. 1 and 10 are designated with the same reference numerals, and description thereof will be omitted.

In FIG. 7, a panning controller 702 serving as a changer performs the same panning processing as in Embodiment 1, and also performs control of a variable HPF (low-frequency blocking filter) 701 having a variable cut-off frequency. Reference numeral 703 shows a microcomputer for processing operation in Embodiment 2.

Figure 8:
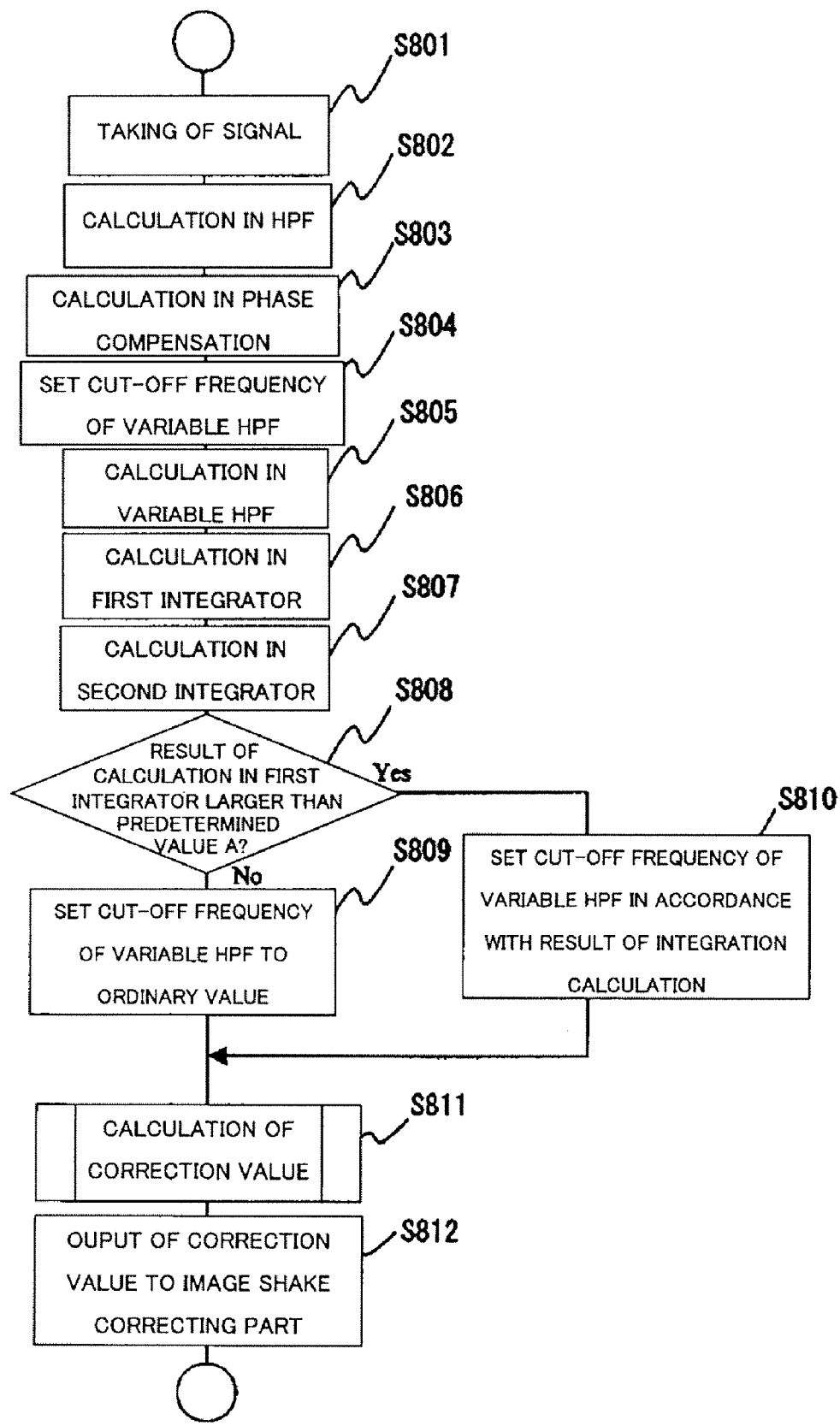
FIG. 8 is a flow chart showing the operation of a microcomputer in Embodiment 2.
Figure 9:
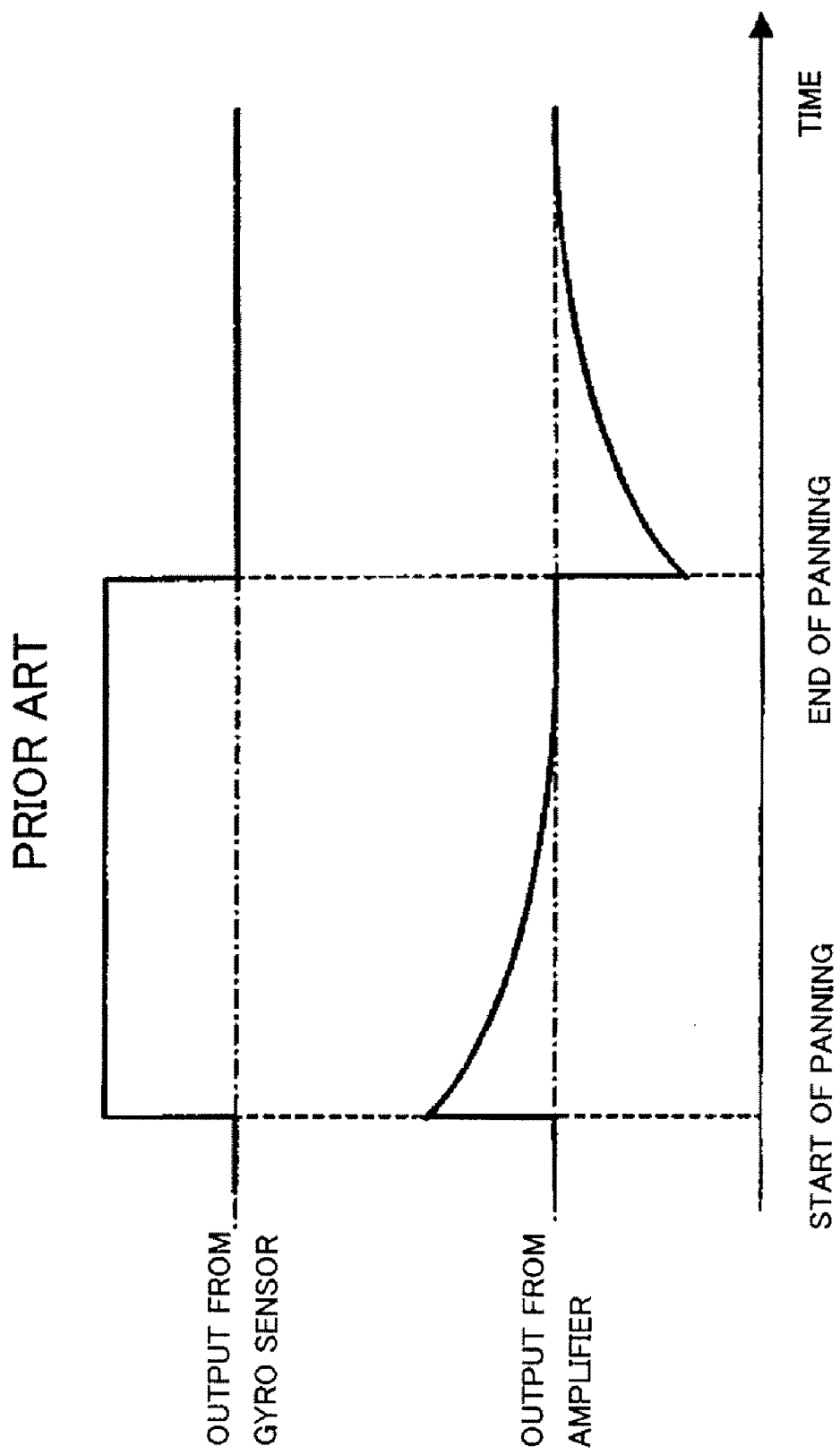
FIG. 9 is a diagram for comparing the output from a gyro-sensor and the output from an HPF in the related art.

FIG. 8 is a flow chart showing the operation of the microcomputer 703 in Embodiment 2.

In FIG. 8, the processing from step S801 to step S803 is identical to the processing from step S201 to step S203 in FIG. 2. In other words, at those steps, the calculations in an A/D converter 104, an HPF 105, and a phase compensation filter 106 are performed.

At step S804, the cut-off frequency of the variable HPF 701 is set. The cut-off frequency set at this step is a value determined by the panning controller 702. An initial value is a cut-off frequency in ordinary control. At step S805, the calculation in the variable HPF 701 with the cut-off frequency determined at step S804 is performed. At step S806, the calculation in a first integrator 107 is performed.

Next, at step S807, the calculation in a second integrator 109 is performed. At step S808, it is determined whether or not the result of the calculation (first correction value) in the first integrator 107, that is, the calculation result at step S806 exceeds a predetermined value A. The predetermined value A is a reference value for detecting panning and is set to a value close to the correction end similarly to the predetermined value B described in Embodiment 1.

If the calculation result is equal to or lower than the predetermined value A, the cut-off frequency of the variable HPF 701 is set to an ordinary value at step S809. If the calculation value at step S806 is larger than the predetermined value A, the cut-off frequency of the variable HPF 701 is set in accordance with the calculation result at step S810.

Then, at step S811, a correction value (second correction value) for use in actually driving an image shake correcting part 112 at step S811 is calculated. The calculation of the second correction value is identical to the processing shown in FIG. 3, which is performed at step S206 in FIG. 2. The characteristic of the second integrator 109 is provided as shown in FIGS. 5 and 6 similarly to Embodiment 1. At step S812, the second correction value is output to the image shake correcting part 112.

As described above, the cut-off frequency of the variable HPF 701 is changed on the basis of whether or not panning is being performed, which can reduce an increased DC component. Thus, the cut-off frequency of the HPF 105 can be set to 0.1 Hz or lower. In other words, the stability can be increased when an image of a still object is picked up.

In the conventional method, the cut-off frequency of the HPF when panning is detected is increased to approximately 20 Hz to cut the DC component, thereby reducing a centering operation and the swing-back operation after the panning. In Embodiment 2, however, similarly to Embodiment 1, the processing in which the subtraction amount calculated from the output of the second integrator 109 is subtracted from the first correction value enables to set the cut-off frequency of the variable HPF to approximately 0.5 Hz to 1.2 Hz at which the image stabilization effect is more adequately achieved as compared with the set value of the cut-off frequency in the conventional method. The image stabilization effect can be provided immediately after the completion of the panning.

As described above, according to Embodiment 2, the subtraction amount D is changed in accordance with the output of the first integrator 107, and the characteristic of the variable HPF 701 is changed when panning is detected. This can improve the behavior of the image after the panning and enhance the stability in ordinary image-pickup operation.

According to Embodiments 1 and 2, the behavior of the image when panning is performed (especially after panning) can be improved and the image shake correction operation can be started immediately after the completion of the panning, while the stability of images is maintained in ordinary image-pickup operation.

Embodiments 1 and 2 have been described in conjunction with the image-pickup apparatus such as a video camera serving as an optical apparatus. However, the present invention is applicable to an interchangeable lens which is removably mounted on the image-pickup apparatus and serves as an optical apparatus.

Furthermore, the present invention is not limited to these preferred embodiments and various variations and modifications may be made without departing from the scope of the present invention.

This application claims foreign priority benefits based on Japanese Patent Application No. 2006-005545, filed on Jan. 13, 2006, which is hereby incorporated by reference herein in its entirety as if fully set forth herein.

What is claimed is:

1. An image stabilization apparatus comprising:
a shake sensor configured to detect shake;
a shake correcting part configured to correct image shake;
a first integrator configured to output a first correction value based on an output from the shake sensor;

a second integrator configured to output a second correction value based on the output of the shake sensor, the second correction value corresponding to a DC component during panning;

a subtraction amount calculator configured to calculate a subtraction amount based on the second correction value; and a controller configured to subtract the subtraction amount from the first correction value to calculate a shake correction value and then control drive of the shake correcting part based on the shake correction value.

2. The image stabilization apparatus according to claim 1, wherein the subtraction amount calculator is configured to determine a coefficient based on the first correction value and multiply the second correction value by the coefficient to calculate the subtraction amount.

3. The image stabilization apparatus according to claim 2, wherein the subtraction amount calculator is configured to set the subtraction amount to zero when the first correction value is lower than a reference value for detecting panning and set the subtraction value to a value larger than zero and varying depending on the first correction value when the first correction value is higher than the reference value for detecting panning.

4. The image stabilization apparatus according to claim 1, wherein each of the first and second integrators comprises a low-pass filter having a gain.

5. The image stabilization apparatus according to claim 4, wherein the gains of the first and second integrators are equal to each other.

6. The image stabilization apparatus according to claim 1, wherein a cut-off frequency of the second integrator is lower than that of the first integrator.

7. The image stabilization apparatus according to claim 1, further comprising:

a low-frequency blocking filter configured to have a variable cut-off frequency; and a changer configured to change the cut-off frequency of the low-frequency blocking filter in accordance with the first correction value.

8. An optical apparatus comprising:
the image stabilization apparatus according to claim 1.

9. An image stabilization apparatus comprising:
a shake sensor configured to detect shake;
a shake correcting part configured to correct image shake;
a first integrator configured to output a first correction value based on an output from the shake sensor;
a second integrator configured to output a second correction value based on the output of the shake sensor, the second correction value corresponding to a DC component during panning;

a panning detector configured to detect that the image stabilization apparatus is in a panning state when the first correction value exceeds a predetermined value;

a subtraction amount calculator configured to calculate a subtraction amount based on the second correction value; and a controller configured to, in response to detection that the image stabilization apparatus is in the panning state, subtract the subtraction amount from the first correction value to calculate a shake correction value and then control drive of the shake correcting part based on the shake correction value.

10. The image stabilization apparatus according to claim 9, wherein the subtraction amount calculator is configured to determine a coefficient based on the first correction value and multiply the second correction value by the coefficient to calculate the subtraction amount.

11. The image stabilization apparatus according to claim 10, wherein the subtraction amount calculator is configured to set the subtraction amount to zero when the first correction value is lower than a reference value for detecting panning and set the subtraction value to a value larger than zero and varying depending on the first correction value when the first correction value is higher than the reference value for detecting panning.

12. The image stabilization apparatus according to claim 9, wherein each of the first and second integrators comprises a low-pass filter having a gain.

13. The image stabilization apparatus according to claim 12, wherein the gains of the first and second integrators are equal to each other.

14. The image stabilization apparatus according to claim 9, wherein a cut-off frequency of the second integrator is lower than that of the first integrator.

15. The image stabilization apparatus according to claim 9, further comprising:

a low-frequency blocking filter configured to have a variable cut-off frequency; and a changer configured to change the cut-off frequency of the low-frequency blocking filter in accordance with the first correction value.

16. An optical apparatus comprising:
the image stabilization apparatus according to claim 9.

* * * * *